(12) United States Patent
Choi

(10) Patent No.: US 12,430,687 B2
(45) Date of Patent: Sep. 30, 2025

(54) CHART ANALYSIS METHOD AND CHART ANALYSIS PROVISION DEVICE USING THE SAME

(71) Applicant: Han Chul Choi, Seongnam-si (KR)

(72) Inventor: Han Chul Choi, Seongnam-si (KR)

( * ) Notice: Subject to any disclaimer, the term of this patent is extended or adjusted under 35 U.S.C. 154(b) by 0 days.

(21) Appl. No.: 18/854,963

(22) PCT Filed: Apr. 4, 2023

(86) PCT No.: PCT/KR2023/004492
§ 371 (c)(1),
(2) Date: Oct. 7, 2024

(87) PCT Pub. No.: WO2023/195726
PCT Pub. Date: Oct. 12, 2023

(65) Prior Publication Data
US 2025/0166066 A1    May 22, 2025

(30) Foreign Application Priority Data
Apr. 7, 2022 (KR) .................... 10-2022-0043607

(51) Int. Cl.
*G06Q 40/04* (2012.01)
*G06Q 40/06* (2012.01)

(52) U.S. Cl.
CPC ............. *G06Q 40/04* (2013.01); *G06Q 40/06* (2013.01)

(58) Field of Classification Search
CPC ............................... G06Q 40/04; G06Q 40/06
See application file for complete search history.

(56) References Cited

U.S. PATENT DOCUMENTS

| | | | | |
|---|---|---|---|---|
| 2007/0282728 A1* | 12/2007 | Carpenter | .............. | G06Q 40/06 705/36 R |
| 2008/0189634 A1* | 8/2008 | Tevanian | ............... | G06Q 30/02 715/764 |
| 2015/0026095 A1* | 1/2015 | Ohana | ................... | G06Q 40/06 705/36 R |

FOREIGN PATENT DOCUMENTS

| | | | | |
|---|---|---|---|---|
| CA | 2344739 A1 * | 12/2001 | .......... | G06Q 20/403 |
| JP | 5372743 B2 | 12/2013 | | |
| JP | 2022-27933 A | 2/2022 | | |
| KR | 10-2003-0074952 A | 9/2003 | | |
| KR | 10-2009-0042236 A | 4/2009 | | |
| KR | 10-2013-0128534 A | 11/2013 | | |
| KR | 10-2019-0000077 A | 1/2019 | | |

(Continued)

OTHER PUBLICATIONS

Khan Academy: How to make a histogram, 2016, https://www.khanacademy.org/math/ap-statistics/quantitative-data-ap/histograms-stem-leaf/v/histograms-intro, pp. 1-5 (Year: 2016).*

(Continued)

*Primary Examiner* — Bijendra K Shrestha
(74) *Attorney, Agent, or Firm* — Invenstone Patent LLC

(57) ABSTRACT

The present invention relates to a chart analysis method for successfully leading a transaction by reflecting market psychology, the method comprising the steps of: receiving, from each of a plurality of different users, parameter values for technical analysis of one type stock; determining the weight for each of the plurality of different users with respect to the received parameter values; determining optimum parameter values by using the determined weight and the parameter values received from the plurality of users; and providing the determined optimum parameter values to the users.

20 Claims, 6 Drawing Sheets

(56) References Cited

FOREIGN PATENT DOCUMENTS

| KR | 20190000077 A | * | 1/2019 | ............ G06Q 40/06 |
| KR | 20290000077 A | * | 1/2019 | |
| KR | 10-2091624 B1 | | 3/2020 | |
| KR | 10-2021-0058178 A | | 5/2021 | |
| WO | WO-2007130338 A2 | * | 11/2007 | ............ G06Q 40/06 |
| WO | WO-2011133225 A2 | * | 10/2011 | ............ G06Q 40/08 |

OTHER PUBLICATIONS

Birbeck et al.: Using Stock Prices as Ground Truth in Sentiment Analysis to Generate Profitable Trading Signals, Nov. 7, 2018, pp. 1-8. (Year: 2018).*

Korczak et al.: Fundamental Analysis in the multi-agent trading system, 2016, Proceedings of the Federated Conference on Computer Science, paged 1169-1174. (Year: 2016).*

Khan Academy: How to make a histogram, 2016, https:/Avww.khanacademy.org/math/ap-statistics/quantitative-data-ap/histograms-stem-leaf/v/histograms-intro, pages1-5 (Year: 2016).*

* cited by examiner

STOCK ITEM (Z)

| USER | TECHNICAL INDICATOR ▼ | PARAMETER SETTING |
|---|---|---|
| A | SUPPORT LINE | $ 110 |
| B | SUPPORT LINE | $ 105 |
| C | SUPPORT LINE | $ 115 |

FIG. 5A

| USER | STOCK ITEM | PROFITABILITY | TECHNICAL INDICATOR | ERROR RATE |
|---|---|---|---|---|
| A | Z | 120% | SUPPORT LINE | −0.13% |
| | | | RSI | −0.89% |
| | Y | −30% | SUPPORT LINE | 0.98% |
| B | Z | 25% | SUPPORT LINE | 1.46% |
| | | | RSI | 0.37% |
| C | Z | −40% | SUPPORT LINE | −2.35% |
| | | | RSI | 0.69% |

FIG. 5B

CHART ANALYSIS METHOD AND CHART ANALYSIS PROVISION DEVICE USING THE SAME

CROSS-REFERENCE TO RELATED APPLICATIONS

This application is a National Stage filing under 35 U.S.C. 371 of International Application No. PCT/KR2023/004492, filed on Apr. 4, 2023, which claims the benefit of earlier filing date and right of priority to Korean Application No. 10-2022-0043607 filed on Apr. 7, 2022 in the Korean Intellectual Property Office, the contents of which are all hereby incorporated by reference herein in their entirety.

BACKGROUND OF THE DISCLOSURE

Technical Field

The present invention relates to a chart analysis provision method and a chart analysis provision device using the same.

Background Art

With the development of information and communication technology, stock and product investments are actively being made online, so various stock trading services are being provided.

Technical analysis is one of the techniques for analyzing and predicting financial markets including the stock market. Price graphs (charts) are mainly used for technical analysis.

Since the technical analysis has a highly subjective nature. Most market participants have different experiences and skill acquisition levels, the results are different.

The technical analysis predicts how future prices will move based on several assumptions and past and present price movements. The validity of the technical analysis depends on past market experience.

However, stock investors often fail to invest in stocks due to lack of information and lack of systematic analysis when using the typical stock trading system.

Therefore, a chart analysis method that leads to successful trading is required.

The technology that forms the background of the invention has been written to facilitate a better understanding of the present invention. It should not be understood that the matters described in the technology that forms the background of the invention exist as the related art.

SUMMARY OF THE DISCLOSURE

The technical analysis has the highly subjective nature, which leads to a problem in that there is no definitive answer and the technical analysis depends on one's perspective and interpretation.

There is a problem in that the results vary depending on the experience and skill acquisition level of most analysts.

Accordingly, the inventors of the present invention sought to study a chart analysis method that may reflect experiences of people with high return on investment since there is no definitive answer to a priori experience.

More specifically, the inventors of the present invention sought to study a chart analysis method that may reduce errors in stock trading by receiving technical analysis indicator values from each of a plurality of different users.

As a result, the inventors of the present invention developed a chart analysis method based on experience of people with high return on investment and accuracy.

Furthermore, the inventors of the present invention developed a chart analysis method and device using collective intelligence.

Aspects of the present invention are not limited to the above-mentioned aspects. That is, other aspects that are not mentioned may be obviously understood by those skilled in the art from the following specification.

In order to solve the above-described problem, a chart analysis method and a chart analysis provision device according to an embodiment of the present invention are provided.

One aspect of the present invention provides a chart analysis method implemented by a processor, including: receiving, from each of a plurality of different users, parameter values for technical analysis of one type stock; determining weights for each of the plurality of different users with respect to the received parameter values; determining optimum parameter values by using the determined weights and the parameter values received from the plurality of users; and providing the determined optimum parameter values to the users.

The determining of the weights may include substituting profitability or error rates into the weights using at least one of a function or algorithm that makes a sum of the weights of each of the plurality of different users equal to 1.

The determining of the weights may further include substituting the error rates of each of the plurality of different users into the weights.

The error rates may include at least one of error rates for the same type of parameter values as the received parameter values for the type stock, or error rates including a different type of parameter values from the received parameter values.

The substituting of the error rates into the weights may further include standardizing or averaging errors of each type of parameter values different from the received parameter values.

The providing of the determined optimum parameter values to the users may further include providing a trading signal for the determined optimal parameter values for the item.

The chart analysis method may further include providing a histogram including the number of the plurality of users compared to the parameter values received from the plurality of users.

The chart analysis method may further include determining the plurality of different users from the entire users based on a return rate.

In order to solve the above-described problem, chart analysis according to another embodiment of the present invention is provided. Another aspect of the present invention provides a chart analysis provision device, including: a communication unit configured to receive, from each of a plurality of different users, parameter values for technical analysis of one type stock; a processor configured to communicate with the communication unit, in which the processor is configured to determine weights for each of the plurality of different users with respect to the received parameter values, determine optimum parameter values by using the determined weights and the parameter values received from the plurality of users, and provide the determined optimum parameter values to the users.

When determining the weights, the processor may be configured to substitute profitability or error rates into the weights using at least one of a function or algorithm that makes a sum of the weights of each of the plurality of different users equal to 1.

When determining the weights, the processor may be configured to substitute the error rates of each of the plurality of different users into the weights.

The error rates may include at least one of error rates for the same type of parameter values as the received parameter values for the type stock, or error rates including a different type of parameter values from the received parameter values.

When substituting the error rates into the weights, the processor may be further configured to standardize or average errors of each type of parameter values different from the received parameter values.

When providing the determined optimum parameter values to the users, the processor may be further configured to provide a trading signal for the determined optimal parameter values for the item.

The chart analysis provision device may further include a histogram including the number of the plurality of users compared to the parameter values received from the plurality of users.

The processor may be further configured to determine the plurality of different users from the entire users based on a return rate.

Detailed contents of other exemplary embodiments are described in a detailed description and are illustrated in the drawings.

According to the present invention, it is possible to provide a chart analysis method for successfully leading trading and a chart analysis provision device using the same.

In addition, according to the present invention, by receiving parameter values for technical analysis from each of the plurality of users, it is possible to solve a problem in that errors are highly likely to occur as the number of samples is small, which is a limitation of technical analysis.

In addition, according to the present invention, by assigning higher weights to users with higher profitability and accuracy to provide optimum parameter values to users, it is possible to provide users with a high-accuracy chart analysis method and a device using the same.

The effects according to the present invention are not limited to the contents exemplified above, and further various effects are included in the present specification.

BRIEF DESCRIPTION OF THE DRAWINGS

FIGS. 5A and 5B are exemplary diagrams for describing the chart analysis method according to an embodiment of the present invention.

DETAILED DESCRIPTION OF THE DISCLOSURE

Figure 1:
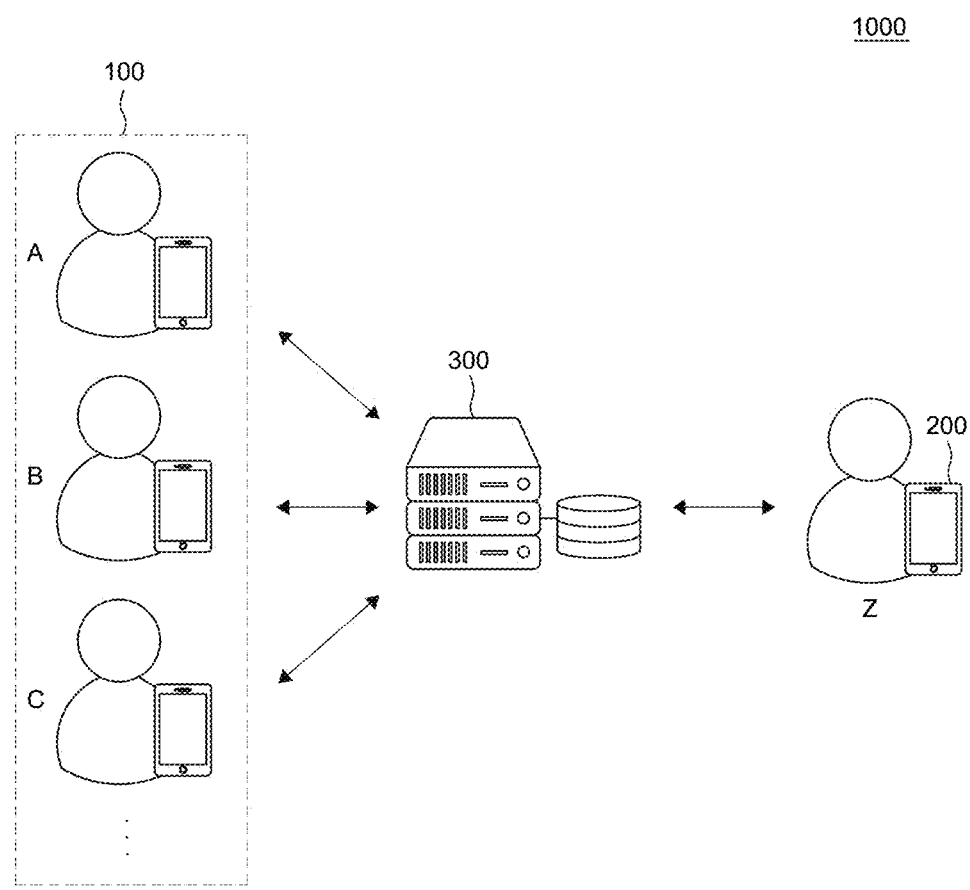
FIG. 1 is a schematic diagram of a chart analysis provision system according to an embodiment of the present invention.

Advantages and features of the present invention and methods to achieve them will be elucidated from embodiments described below in detail with reference to the accompanying drawings. However, the present invention is not limited to embodiments disclosed below, and may be implemented in various different forms, these embodiments will be provided only in order to make the present invention complete and allow one of ordinary skill in the art to which the present invention pertains to completely recognize the scope of the present invention. Throughout the drawings, similar components will be denoted by similar reference numerals.

In the disclosure, an expression "have", "may have", "include", "may include", or the like, indicates existence of a corresponding feature (for example, a numerical value, a function, an operation, a component such as a part, or the like), and does not exclude existence of an additional feature.

In the present invention, an expression "A or B", "at least one of A and/or B", "one or more of A and/or B", or the like, may include all possible combinations of items enumerated together. For example, "A or B", "at least one of A and B", or "at least one of A or B" may indicate all of 1) a case where at least one A is included, 2) a case where at least one B is included, or 3) a case where both of at least one A and at least one B are included.

Expressions "first," "second," "1st" or "2nd" or the like, used in the present invention may indicate various components regardless of a sequence and/or importance of the components, will be used only in order to distinguish one component from the other components, and do not limit the corresponding components. For example, a first user device and a second user device may indicate different user devices regardless of a sequence or importance thereof. For example, the 'first' component may be named the 'second' component and the 'second' component may also be similarly named the 'first' component, without departing from the scope of the present invention.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component). On the other hand, when it is mentioned that any component (for example, a first component) is "directly coupled" or "directly connected" to another component (for example, a second component), it is to be understood that the other component (for example, a third component) is not present between any component and another component.

An expression "configured (or set) to" used herein may be replaced by an expression "suitable for", "having the capacity to" "designed to", "adapted to", "made to", or "capable of" depending on a situation. The term "~configured (or set) to" may not necessarily mean "specifically designed to" in hardware. Instead, in some situations, an expression "device configured to~" may mean that the device may "do" together with other devices or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

Terms used in the present invention may be used only to describe specific embodiments rather than restricting the scope of other embodiments. Singular forms may include plural forms unless the context clearly indicates otherwise. All terms used herein including technical and scientific terms have the same meanings as those that are generally understood by those skilled in the art to which the present invention pertains. Terms defined by a general dictionary among terms used in the present invention may be interpreted as meaning that are the same as or similar to meanings within a context of the related art, and are not interpreted as ideal or excessively formal means unless clearly defined in the present invention. In some cases, terms may not be interpreted to exclude embodiments of the present invention even though they are defined in the present invention.

Each feature of various embodiments of the present invention may be partially or fully coupled or combined with each other, and as may be fully understood by those skilled in the art, various technical linkages and operations are possible, and each embodiment may be implemented independently of each other and may be performed together due to the related relationship.

For clarity in the interpretation of this specification, the terms used in this specification will be defined below.

FIG. 1 is a schematic diagram of a chart analysis provision system according to an embodiment of the present invention. Referring to FIG. 1, a chart analysis system 1000 may be a system configured to receive parameter values for technical analysis of one type stock from each of a plurality of different users, process the received parameter values, and then provide the results to the users.

In this case, the chart analysis system 1000 may include a plurality of different user devices 100 that provide parameter values for the technical analysis, a user device 200 that provides chart analysis results, and a chart analysis server 300 that analyzes charts using the received parameter values.

In the present disclosure, the parameter values may mean various technical analysis indicators used for chart analysis. For example, the parameter value includes, but are not limited to, a support line, a resistance line, a relative strength index (RSI), a moving average (MA), a moving average convergence divergence (MACD), a Bollinger band (BB), a cut loss signal price, etc., and may include more diverse indicators.

The plurality of different user devices 100 are electronic devices of people performing the chart analysis. The chart analysis server 300 may receive whether to consent to providing the parameter values input through the device 100.

The plurality of different user devices 100 are electronic devices that provide a user interface for performing the chart analysis, and may include at least one of a smartphone, a tablet personal computer (PC), a laptop, and/or a PC.

The user device 200 is an electronic device of a person who wants to analyze a chart for a stock item, and may request information for the chart analysis from the chart analysis server 300 through the device 200.

In the present disclosure, the information for the chart analysis may be, but is not limited to, a histogram that indicates recommended parameter values for a technical analysis indicator of one type stock, recommended parameter values for a technical analysis indicator according to a user return rate, a trading signal according to the recommended parameter values, and parameter value results of other users.

The histogram may be a graph showing the number of the plurality of users compared to parameter values received from the plurality of users.

The user return rate may indicate a return rate for the user's invested capital.

Only when the person performing the chart analysis agrees to provide the parameter values, the user device 200 may receive the parameter values collected from the chart analysis server 300 and display the received results through the display unit to be described below.

The user device 200 is an electronic device that provides a user interface for displaying the chart analysis results, and may include a smartphone, a tablet PC, a PC, a laptop, etc.

The chart analysis server 300 may include a general-purpose computer, a laptop, and/or a data server, and the like that performs various operations to determine the optimum parameter value using the parameter values for the technical analysis provided from each of the plurality of different user devices 100. In various embodiments, the chart analysis server 300 may be a web server that provides a web page regarding a chart analysis service or a mobile web server that provides a mobile website according to a client's request, but is not limited thereto.

More specifically, the chart analysis server 300 may receive the parameter values for the technical analysis of one type stock from each of the plurality of different user devices 100, determine weights for each of the plurality of different users using the received parameter values, and determine the optimum parameter values from the determined weights.

The chart analysis server 300 is illustrated as one server, but may also be configured as a server for storing and transmitting/receiving parameter values, charts, and information on items, and a server for providing an interface for charts and items.

The chart analysis server 300 may provide chart analysis results to the user device 200.

In this way, the information provided from the chart analysis server 300 may be provided as a web page through a web browser installed on the user device 200, or may be provided in the form of an application or program. In various embodiments, such data may be provided in a form included in a platform in a client-server environment.

Figure 2:
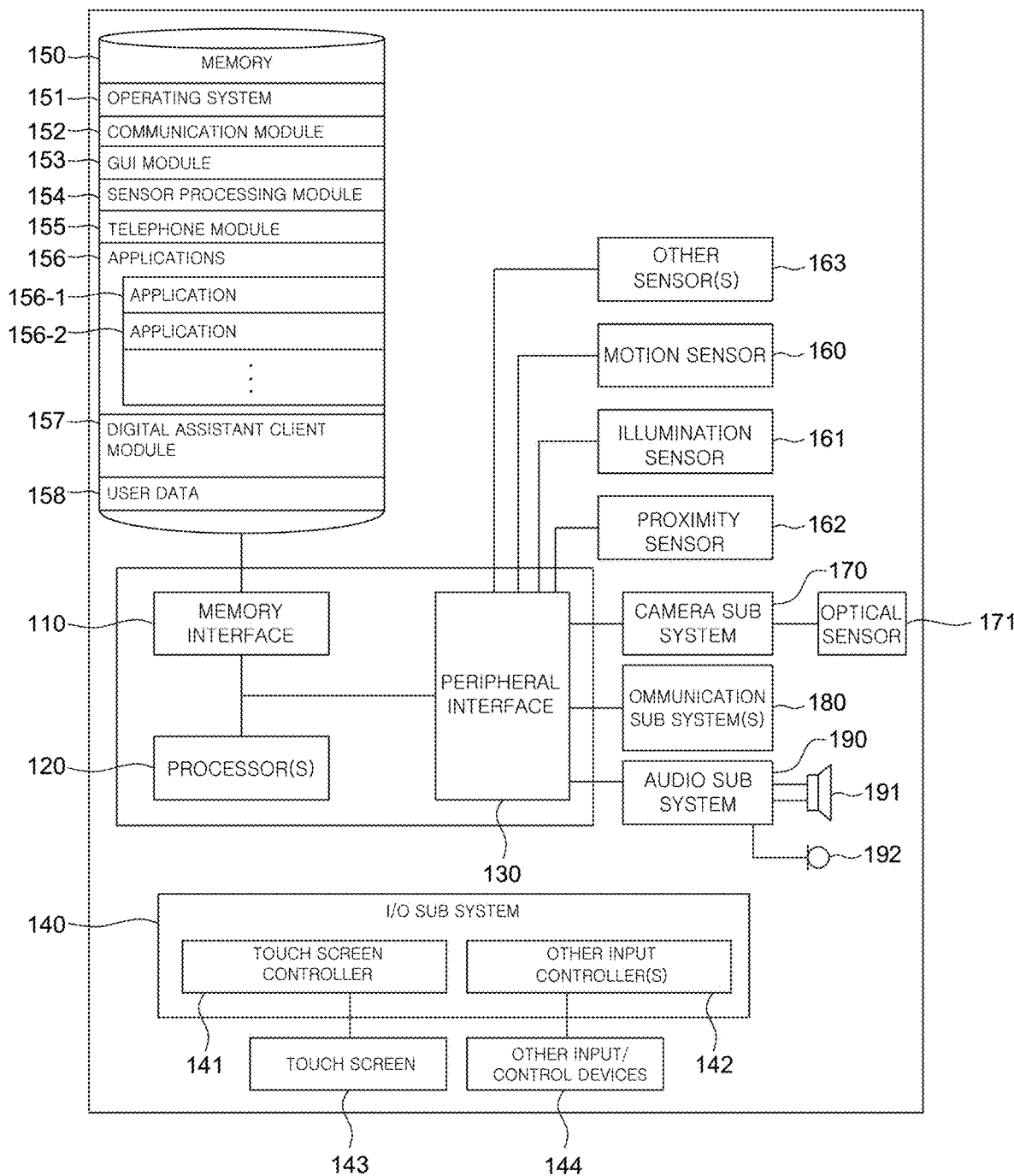
FIG. 2 is a block diagram illustrating a configuration of a user device according to an embodiment of the present invention.

FIG. 2 is a block diagram illustrating a configuration of the user device 200 according to an embodiment of the present invention.

Referring to FIG. 2, the user device 200 may include a memory interface 110, one or more processors 120, and a peripheral interface 130. Various components in the plurality of different user devices 100 (hereinafter, user devices 300) may be connected by one or more communication buses or signal lines.

The memory interface 110 may be connected to a memory 150 to transmit various data to the processor 120. Here, the memory 150 may include at least one type of storage media such as flash memory type, hard disk type, multimedia card micro type, card type memory (for example, SD or XD memory, etc.), RAM, SRAM, ROM, EEPROM, PROM, network storage, cloud, and blockchain database.

In various embodiments, the memory 150 may store at least one of an operating system 151, a communication module 152, a graphical user interface (GUI) module 153, a sensor processing module 154, a telephone module 155, and an application module 156. Specifically, the operating system 151 may include instructions for processing basic system services and instructions for performing hardware operations. The communication module 152 may communicate with at least one of other devices, computers, and servers. The graphical user interface (GUI) module 153 may process a graphical user interface. The sensor processing module 154 may process sensor-related functions (e.g., processing voice input received using one or more microphones 192). The telephone module 155 may process a telephone-related function. The application module 156 may perform various functions of a user application, such as electronic messaging, web browsing, media processing, navigation, imaging, and other processing functions. In addition, the user device 200 may store one or more software applications 156-1 and 156-2 (e.g., chart analysis application) related to any one type of service in the memory 150.

In various embodiments, the memory 150 may store a digital assistant client module 157 (hereinafter, DA client module), and accordingly, may store instructions for performing client-side functions of the digital assistant and various user data 158 (e.g., other data such as user-customized vocabulary data, preference data, user's electronic address book, to-do list, and shopping list).

Meanwhile, the DA client module 157 may obtain user's voice input, text input, touch input, and/or gesture input through various user interfaces (e.g., I/O subsystem 140) provided in a plurality of different user devices 100 (hereinafter, user devices 300).

In addition, the DA client module 157 may output data in an audiovisual or tactile form. For example, the DA client module 157 may output data composed of a combination of at least one or two of the following: voice, sound, notification, text message, menu, graphic, video, animation, and vibration. In addition, the DA client module 157 may communicate with a digital assistant server (not illustrated) using the communication subsystem 180.

In various embodiments, the DA client module 157 may collect additional information on the surrounding environment of the plurality of different user devices 100 (hereinafter, user devices 300) from various sensors, subsystems, and peripheral devices to construct a context associated with the user input. For example, the DA client module 157 may provide context information along with the user input to a digital assistant server to infer the user's intention. Here, the context information that may accompany the user input may include sensor information, such as lighting, ambient noise, ambient temperature, and images of the surrounding environment, videos. As another example, the context information may include physical states (e.g., device orientation, device position, device temperature, power level, speed, acceleration, motion pattern, cellular signal strength, etc.) of the plurality of different user devices 100 (hereinafter, user devices 300). As another example, the context information may include information (e.g., processes running on the plurality of different user devices 100, installed programs, past and present network activity, background services, error logs, resource usage, etc.) related to a software status of a plurality of different user devices 100 (hereinafter, user devices 300).

In various embodiments, the memory 150 may include additional or deleted instructions, and furthermore, the user device 200 may include additional components or exclude some components in addition to the components illustrated in FIG. 2.

The processor 120 may control the overall operation of the user device 200, and may perform various commands to perform the chart analysis by running applications or programs stored in the memory 150.

The processor 120 may correspond to a computational device such as a central processing unit (CPU) or an application processor (AP). In addition, the processor 120 may be implemented in the form of an integrated chip (IC) such as a system on chip (SoC) in which various computational devices such as a neural processing unit (NPU) are integrated.

The peripheral interface 130 may be connected to various sensors, subsystems, and peripheral devices to provide data so that the user device 200 may perform various functions. Here, the functionality performed by the user device 200 may be understood as being performed by the processor 120.

The peripheral interface 130 may receive data from a motion sensor 160, an illumination sensor (light sensor) 161, and a proximity sensor 162, so the user device 200 may perform orientation, light, proximity detection functions, etc. As another example, the peripheral interface 130 may receive data from other sensors 163 (positioning system—GPS receiver, temperature sensor, and biometric sensor), so the user device 200 may perform functions related to the other sensors 163. In various embodiments, the user device 200 may include a camera subsystem 170 connected to the peripheral interface 130 and an optical sensor 171 connected thereto, so the user device 200 may perform various capturing functions, such as taking pictures and recording video clips.

In various embodiments, the user device 200 may include a communication subsystem 180 connected to the peripheral interface 130. The communication subsystem 180 may include one or more wired/wireless networks and may include various communication ports, radio frequency transceivers, and optical transceivers.

In various embodiments, the user device 200 may include an audio subsystem 190 connected to the peripheral interface 130, and the audio subsystem 190 may include one or more speakers 191 and one or more microphones 192, so that the plurality of different user devices 100 (hereinafter, the user device 200) may perform voice-activated functions, such as voice recognition, voice duplication, digital recording, and telephone functions.

In various embodiments, the user device 200 may include the I/O subsystem 140 connected to the peripheral interface 130. For example, the I/O subsystem 140 may control a touch screen 143 included in the user device 200 via a touch screen controller 141. As an example, the information for requesting the chart analysis may be entered via the touch screen, and the information on the chart analysis may be determined via the screen. The touch screen controller 141 may detect the user's contact and movement or the stop of the user's contact and movement using any one of a plurality of touch sensing technologies, such as a capacitive type, a resistive type, an infrared type, a surface acoustic wave technology, and a proximity sensor array. As another example, the I/O subsystem 140 may control other input/control devices 144 included in the user device 200 via other input controller(s) 142. As an example, the other input controller(s) 142 may control one or more buttons, rocker switches, thumb-wheels, infrared ports, USB ports, and pointer devices, such as a stylus.

Figure 3:
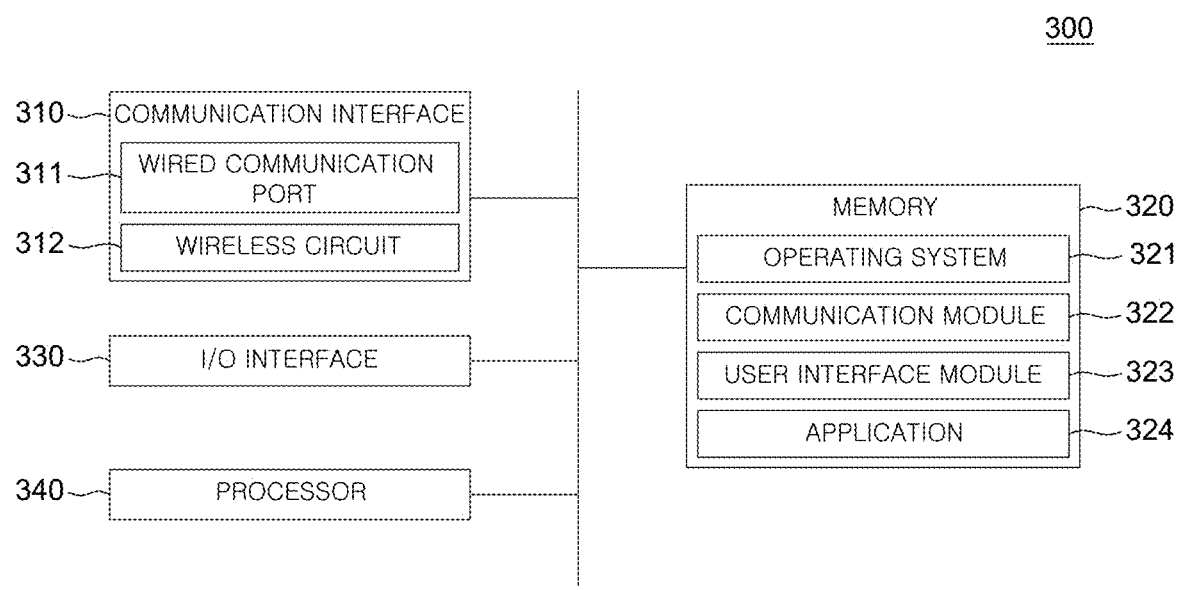
FIG. 3 is a block diagram illustrating a configuration of a chart analysis server according to an embodiment of the present invention.

FIG. 3 is a block diagram illustrating a configuration of a chart analysis server according to an embodiment of the present invention.

Referring to FIG. 3, the chart analysis server 300 may include a communication interface 310, a memory 320, an I/O interface 330, and a processor 340, and each component may communicate with one another through one or more communication buses or signal lines.

The communication interface 310 may be connected to the plurality of different user devices 100 and the user device 200 via a wired/wireless communication network to exchange data. For example, the communication interface 310 may receive the parameter values for the technical analysis from each of the plurality of different user devices 100, and may transmit the determined optimum parameter values to the user device 200.

Meanwhile, the communication interface 310 that enables the transmission and reception of such data includes a communication port 311 and a wireless circuit 312, and the wired communication port 311 may include one or more wired interfaces, for example, Ethernet, a universal serial bus (USB), FireWire, etc. In addition, the wireless circuit 312 may transmit and receive data with an external device via RF signals or optical signals. In addition, the wireless communication may use at least one of a plurality of communication standards, protocols, and technologies, such as GSM, EDGE, CDMA, TDMA, Bluetooth, Wi-Fi, VoIP, Wi-MAX, or any other suitable communication protocol.

The memory 320 may store various data used in the chart analysis server 300. For example, the memory 320 may store parameter values of users, store profitability or error rates, and store functions or algorithms for determining weights.

In various embodiments, the memory 320 may include volatile or nonvolatile recording media capable of storing various data, commands, and information. For example, the memory 320 may include at least one type of storage media such as flash memory type, hard disk type, multimedia card micro type, card type memory (e.g., SD or XD memory, etc.), RAM, SRAM, ROM, EEPROM, PROM, network storage, cloud, and blockchain database.

In various embodiments, the memory 320 may store at least one of an operating system 321, a communication module 322, a user interface module 323, and one or more applications 324.

The operating system 321 (e.g., embedded operating system such as LINUX, UNIX, MAC OS, WINDOWS, and VxWorks) may include various software components and drivers for controlling and managing general system operations (e.g., memory management, storage device control, power management, etc.) and may support communication between various hardware, firmware, and software components.

The communication module 323 may support communication with other devices via the communication interface 310. The communication module 320 may include various software components for processing data received by the wired communication port 311 or the wireless circuit 312 of the communication interface 310.

The user interface module 323 may receive user request or input from a keyboard, a touch screen, a microphone, etc., via the I/O interface 330, and may provide a user interface on a display.

The application 324 may include a program or module configured to be executed by one or more processors 330. Here, the application for providing the chart analysis method may be implemented on a server farm. The application 324 may be software for buying, selling, or analyzing stocks. For example, the application 324 may be a general home trading system (HTS) or a third-party application. The functions described below may operate as some functions of the HTS.

The I/O interface 330 may connect at least one of input/output devices (not illustrated) of the chart analysis server 300, such as a display, a keyboard, a touch screen, and a microphone, to the user interface module 323. The I/O interface 330 may receive the user input (e.g., voice input, keyboard input, touch input, etc.) together with the user interface module 323, and process commands according to the received input.

The display 330 may output various interface screens provided by the chart analysis server/device 300. For example, the display 330 may be a touch-sensitive display. The touch-sensitive display may provide an input interface and an output interface between the device and the user. As another example, the display 330 may be a touch screen. The touch screen may include a sensor that accepts user input based on haptic and tactile contact. As still another example, the display 330 may be a sound display. When the chart analysis server/device 300 includes a sound display, it may output sound without a separate audio device.

The processor 340 may be connected to the communication interface 310, the memory 320, and the I/O interface 330 to control the overall operation of the chart analysis server 300, and may perform various commands for the chart analysis through an application or program stored in the memory 320.

The processor 340 may correspond to a computational device such as a central processing unit (CPU) or an application processor (AP). In addition, the processor 340 may be implemented in the form of an integrated chip (IC) such as a system on chip (SoC) in which various computational devices are integrated. Alternatively, the processor 340 may include a module for calculating an artificial neural network model such as a neural processing unit (NPU).

In various embodiments, the processor 340 may substitute profitability or error rates with weights using at least one of functions or algorithms that make the sum of weights of each of the plurality of different users equal to 1.

Figure 4:
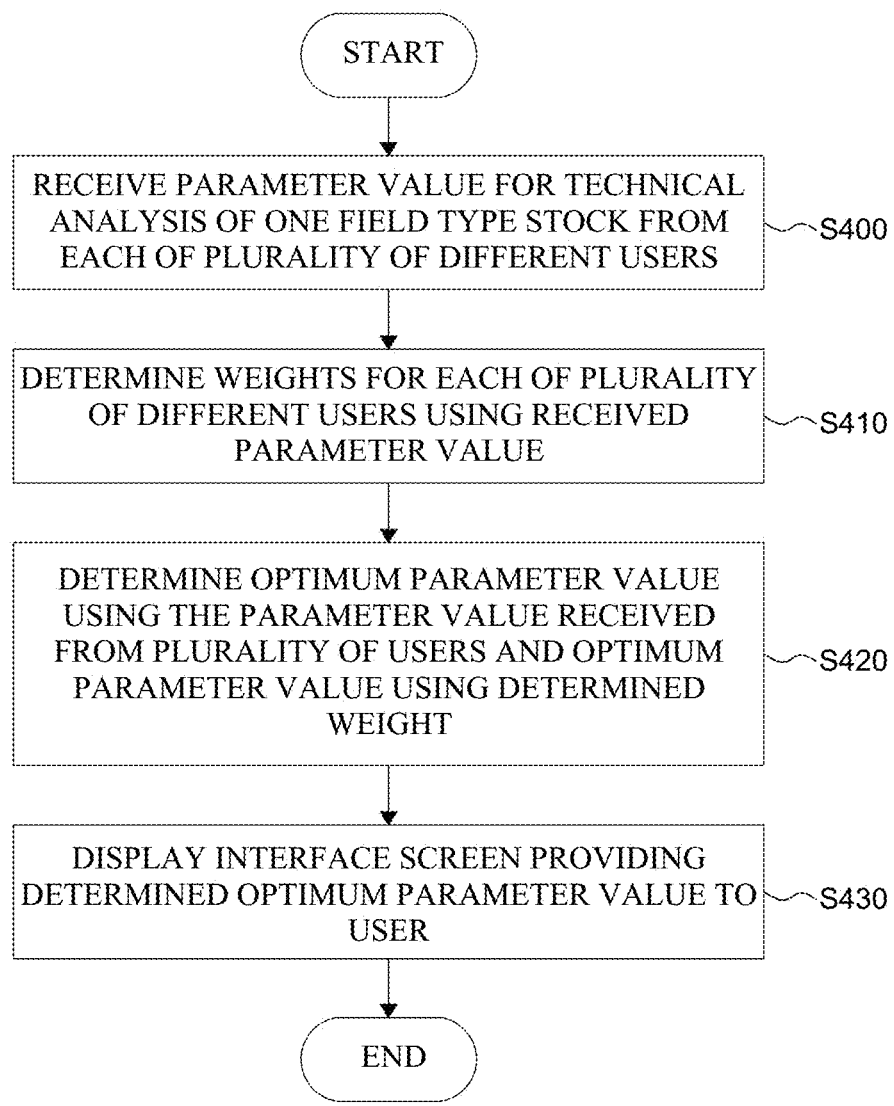
FIG. 4 is a schematic flowchart for describing a chart analysis method according to an embodiment of the present invention.

FIG. 4 is a schematic flowchart for describing a chart analysis method between a user device and a chart analysis server according to an embodiment of the present invention. Hereinafter, for convenience of description, reference will be made to the drawing symbols of FIGS. 5A and 5B.

Referring to FIG. 4, the plurality of different user devices 100 receive parameter values for technical analysis of one type stock from each of the plurality of different users (S400). In this case, the users may select whether to consent to the collection of the parameter values and their use/provision to third parties. The plurality of different user devices 100 may collect and store the received parameter values and transmit the collected and stored parameter values to the chart analysis server 300.

Hereinafter, for convenience of description, a support line, which is one of the various parameter values, will be described as an example. The plurality of different users may be user A, user B, and user C.

Referring to FIG. 5A, user A may display a support line at $110, user B may display a support line at $105, and user C may display a support line at $115. The devices of users A, B, and C may receive the values form users A, B and C respectively.

The received values may be collected and stored, and transmitted to the chart analysis server 300. In this case, these values may be values collected by receiving consent from the user for collection and third-party use and provision.

When the users change the support line, the user device 100 may obtain consent from the user to reflect the changed value. the parameter values may be collected at regular time intervals to reflect the changed value, and the final value obtained by averaging the values before and after the change may be collected.

When the users delete the support line or withdraw the consent for collection and third-party use and provision, the collected values may be discarded. The analysis information including the corresponding values may be discarded.

The method for collecting and discarding stock items, technical analysis indicators, and parameter values described in the presented embodiment are not limited to the above-described contents.

The chart analysis server 300 determines a weights for each of the plurality of different users using the received parameter values (S410). First, to determine the weights, the chart analysis server 300 may substitute the profitability or error rates with the weights using at least one of the function or algorithm that makes the sum of the weights of each of the plurality of different users equal to 1.

In the present disclosure, the profitability may refer to a ratio of profitable trade in the past trading records of the users, and the error rate may refer to the accuracy of chart analysis parameters set in the past. In this case, the error rate may include at least one of error rates for the same type of parameter values as the received parameter values for the one type stock, or error rates including a different type of parameter values from the received parameter values.

For example, the chart analysis server 300 may use a Softmax function to make the sum of the weights of each of the plurality of different users equal to 1.

$$\sigma(z)_i = \frac{e^{z_i}}{\sum_{j=1}^{K} e^{z_j}} \text{ for } i = 1, \ldots, K \text{ and } z = (z_1, \ldots, z_K) \in \mathbb{R}^K.$$

The input value may be the ratio of profitable trade calculated from the past trading records. The output value may be derived as a value between 0 and 1 for each user so that the sum becomes 1. With respect to the method for assigning weights to profitability, the chart analysis server 300 may assign higher weighs to more profitable users. Referring to FIG. 5B, the profitability of user A for stock item (a) is 120%, the profitability of user B is 25%, and the profitability of user C is −40%, the chart analysis server 300 may assign a higher weight to user A. The larger the volume of trading, the higher the weight may be assigned.

With respect to the method for assigning the weights to the accuracy of the past chart analysis, the chart analysis server 300 may assign a higher weight to the more accurate the chart analysis parameter values set in the past. In other words, the smaller the error rate, the higher the weight may be assigned. Hereinafter, for convenience of description, the support line, which is one of the various parameter values, will be described as an example.

When the current stock price is in a downward trend at the $120 level, referring to FIG. 5A, user A displays a support line at $110, user B displays a support line at $105, and user C displays a support line at $115. However, when the stock price rebounds after hitting a bottom at $109, user A's error is |110-109|=1, user B's error is |105-109|=4, and user C's error is |115-109|=6, so user A has the smallest error. In this case, the error takes an absolute value.

When these past records are averaged by user, the average error rate by user is obtained. The chart analysis server 300 may assign higher weight to a user with a smaller error rate. For example, the Softmax Function may be used using (100−error rate) as the function input value.

In various embodiments, the chart analysis server 300 may sum the accuracy of different technical analysis indicators, or may use only the accuracy of the currently handled technical analysis indicator. In other words, when deriving the signal for the support line, the chart analysis server 300 may determine the weight by considering only the error rates of the users' past support line indicators, or may determine the weight by considering the error rates of other technical analysis indicators such as MACD and the support/resistance lines. In the latter case, the chart analysis server 300 may additionally perform a step of standardizing the error of each technical analysis indicator. This may be because the unit of 'error' is different for each technical analysis indicator.

Referring to FIG. 5A, the currently handled technical analysis indicator is the support line, but referring to FIG. 5B, the past indicators of users A, B, and C further include RSI. In other words, the chart analysis server 300 may determine the weight by considering the error rate for RSI as well.

For example, the chart analysis server 300 may normalized the error rate of various technical analysis indicators between 0 and 1 through Equation 1.

$$x = \frac{x - X_{min}}{X_{max} - X_{min}} \quad \text{[Equation 1]}$$

The chart analysis server 300 may the error rate so that the average is 0 and the standard deviation is 1 through Equation 2.

$$x = \frac{x - \mu}{\sigma} \quad \text{[Equation 2]}$$

The chart analysis server 300 may determine optimum parameter value using the parameter values and weights obtained from the plurality of users (S420).

Specifically, the optimum parameter values may be determined by adding the weights substituted in the above process and the parameter values for the support lines collected from the users A, B, and C.

The function or algorithm for substituting the profitability and error rate into the weights and the method for standardizing errors are not limited to the above-described contents.

When the user device 200 requests chart analysis for a stock item, the chart analysis server may display the interface screen that provides the determined optimum parameter values to the user (S430).

Figure 6:
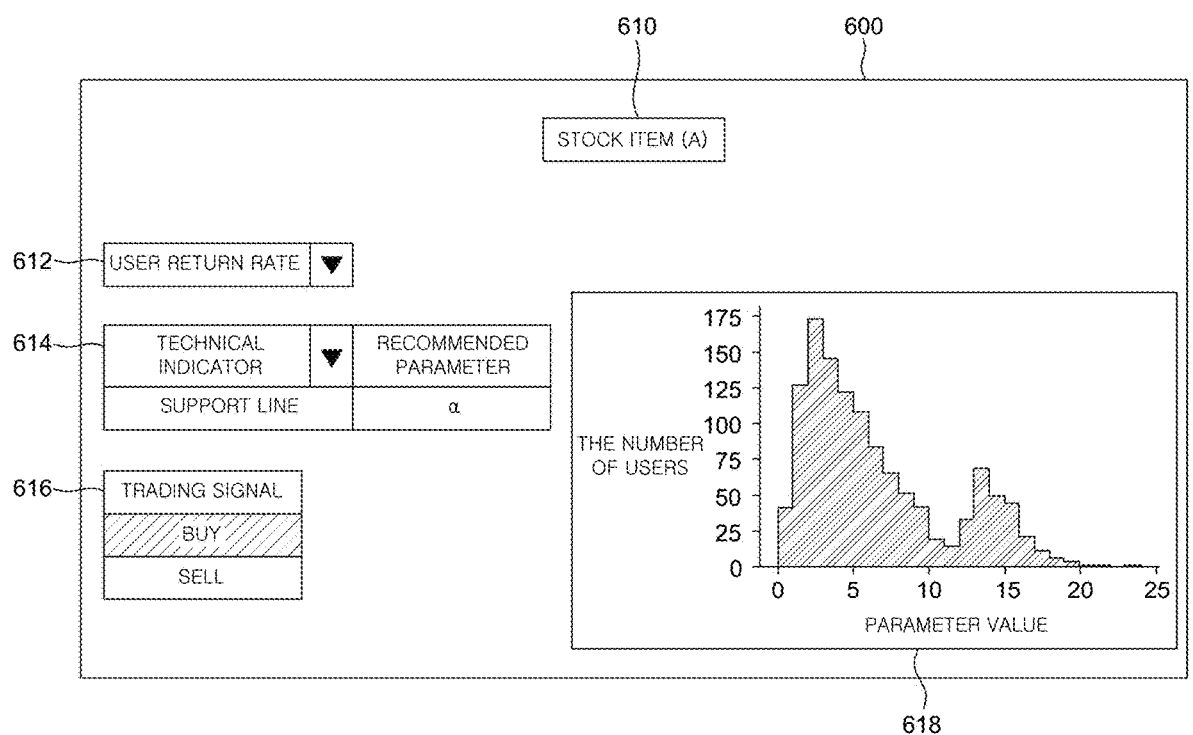
FIG. 6 is an exemplary diagram for an interface screen related to chart analysis according to an embodiment of the present invention.

The following will describe the interface screen related to the chart analysis with reference to FIG. 6.

FIG. 6 is an exemplary diagram for an interface screen related to chart analysis according to an embodiment of the present invention.

Referring to FIG. 6, the user device 200 may display an interface screen 600 for the chart analysis results. The interface screen 600 may have a first area 610 representing a stock item, a second area 612 representing a user return rate, a third area 614 representing a recommended parameter according to a technical indicator, a fourth area 616 representing a trading signal, and a fifth area 618 representing a histogram that indicates the number of different users relative to parameter values.

Here, the graphic object displayed in the second area may include selection items such as "total, return rate of 80% or higher, 60% or higher".

The graphic object displayed in the third area may include selection items such as "support/resistance lines, RSI, and MACD" and represent the recommended parameter as an indicator, and may be represented as a chart type. For example, a chart for the recommended parameter value may be provided in the form of a candle, line, bar, flow, etc.

The graphic object displayed in the fourth area may be an icon or image that notifies the trading signal for the corresponding item according to the recommended parameter value.

In various embodiments, when users are determined based on the profitability, the graphic object may be displayed to represent only the histogram of the determined users. For example, when a user profitability of 80% or higher is selected in the second area 612, a histogram representing the number of users compared to parameter values for users with the user profitability of 80% or higher may be displayed.

The configuration of the interface screen, the user profitability, and the technical analysis indicators described in the presented embodiment are not limited to the above-described contents, and the objects constituting each interface screen may be configured in various ways.

Although the embodiments of the present invention has been described in more detail with reference to the accompanying drawings, the present invention is not necessarily limited to these embodiments, but may be variously modified without departing from the scope and spirit of the present invention. Accordingly, embodiments disclosed in the present invention are not to limit the spirit of the present invention, but are to describe the spirit of the present invention. The scope of the present invention is not limited to these embodiments. Therefore, it should be understood that the above-mentioned embodiments are exemplary in all aspects but are not limited thereto. The scope of the present invention should be interpreted by the following claims and it should be interpreted that all spirits equivalent to the following claims fall within the scope of the present invention.

What is claimed is:

1. A method for providing chart analysis, the method being implemented by a processor and comprising:
    transmitting, to each of a plurality of user devices, a request to consent to collecting parameter values pertaining to one or more stock items, each of the plurality of user devices belonging to a different user;
    receiving, from at least one of the plurality of user devices, an indication to participate in the collecting of the parameter values;
    receiving, from a specific user device, a request for technical analysis of a stock item of the one or more stock items, the specific user device provided separately from the plurality of user devices;
    receiving, from each of the plurality of user devices, parameter values for the requested technical analysis according to the received indication to participate, the received parameter values including a parameter value pertaining to the different user of each of the plurality of user devices;
    determining a weight for each of the plurality of different users with respect to each parameter value of the received parameter values, the weight for each of the plurality of different users determined by substituting error rates into a function or algorithm that makes a sum of the weights of the plurality of different users equal to one;
    determining an optimum parameter value by using the received parameter values and the determined weights of the plurality of different users and the received parameter values, by summing the parameter values received from each of the plurality of user devices and by summing the weights determined for each of the plurality of user devices;
    transmitting, to the specific user device, a trading signal based on the optimum parameter value; and
    transmitting, to the specific user device, display instructions including a graphical object for each of a plurality of display areas of an interface screen, the display instructions causing the specific user device to display the interface screen, the plurality of display areas comprising:
    a first display area displaying a stock item indicator to indicate a requested stock item, and
    a second display area displaying a user return rate indicator to indicate a selectable return rate for the plurality of different users, the graphical object displayed in the second display area enabling a selection of return rates expressed as a minimum percentage.

2. The method of claim 1, wherein the weight for each of the plurality of different users is determined by substituting error rates into a function or algorithm that makes a sum of the weights of the plurality of different users equal to one.

3. The method of claim 2, wherein the error rates include at least one error rate for a parameter value of a same type as the received parameter values.

4. The method of claim 2, wherein the error rates include at least one error rate for a parameter value of a different type from the received parameter values.

5. The method of claim 2, wherein the substituting includes standardizing or averaging errors of parameter values of different types respectively received from the plurality of user devices.

6. The method of claim 1, wherein the weight for each of the plurality of different users is determined by substituting profitability into a function or algorithm that makes a sum of the weights of the plurality of different users equal to one.

7. The method of claim 1, the plurality of display areas further comprising:
    a third display area displaying a recommended parameter indicator to selectively indicate one of the received parameter values as a recommended parameter value, the graphical object displayed in the third display area enabling a selection of a support line, a resistance line, a relative strength index (RSI), and a moving average convergence divergence (MACD),
    a fourth display area displaying a trading signal indicator to indicate one of a buy or sell signal pertaining to the requested stock item, the graphical object displayed in the fourth display area including a notification based on the transmitted trading signal, the notification corresponding to the requested stock item and the recommended parameter value, and
    a fifth display area displaying a histogram to indicate a number of different users relative to parameter values, wherein the selection of the second display area determines the histogram displayed in the fifth display area, the displayed histogram representing a number of users compared to parameter values for users having a return rate of at least the minimum percentage.

8. The method of claim 1, further comprising: generating a histogram comparing a number of different users to the received parameter values.

9. The method of claim 8, further comprising:
    determining the number of different users from an overall number of users based on a return rate.

10. The method of claim 9, wherein the histogram indicates the number of different users compared to parameter values received from a user device of each of the determined number of different users.

11. A device for providing chart analysis, the device comprising:
a processor; and
a communication unit connected to the processor and configured to exchange data with a plurality of user devices and a specific user device provided separately from the plurality of user devices, each of the plurality of user devices belonging to a different user,
wherein the processor is configured to
transmit, to each of the plurality of user devices, a request to consent to collecting parameter values pertaining to one or more stock items,
receive, from at least one of the plurality of user devices, an indication to participate in the collecting of the parameter values,
receive, from the specific user device, a request for technical analysis of a stock item of the one or more stock items,
receive, from each of the plurality of user devices, parameter values for the requested technical analysis according to the received indication to participate, the received Page 6 of 17 application Ser. No. 18/854,963 6 parameter values including a parameter value pertaining to the different user of each of the plurality of user devices,
determine a weight for each of the plurality of different users with respect to each parameter value of the received parameter values, the weight for each of the plurality of different users determined by substituting error rates into a function or algorithm that makes a sum of the weights of the plurality of different users equal to one,
determine an optimum parameter value by using the received parameter values and the determined weights of the plurality of different users and the received parameter values, by summing the parameter values received from each of the plurality of user devices and by summing the weights determined for each of the plurality of user devices, transmit, to the specific user device, a trading signal based on the optimum parameter value, and
transmit, to the specific user device, display instructions including a graphical object for each of a plurality of display areas of an interface screen, the display instructions causing the specific user device to display the interface screen, the plurality of display areas comprising:
a first display area displaying a stock item indicator to indicate a requested stock item, and
a second display area displaying a user return rate indicator to indicate a selectable return rate for the plurality of different users, the graphical object displayed in the second display area enabling a selection of return rates expressed as a minimum percentage.

12. The device of claim 11, wherein the weight for each of the plurality of different users is determined by substituting error rates into a function or algorithm that makes a sum of the weights of the plurality of different users equal to one.

13. The device of claim 12, wherein the error rates include at least one error rate for a parameter value of a same type as the received parameter values.

14. The device of claim 12, wherein the error rates include at least one error rate for a parameter value of a different type from the received parameter values.

15. The device of claim 12, wherein the substituting includes standardizing or averaging errors of parameter values of different types respectively received from the plurality of user devices.

16. The device of claim 11 wherein the weight for each of the plurality of different users is determined by substituting profitability into a function or algorithm that makes a sum of the weights of the plurality of different users equal to one.

17. The device of claim 11, the plurality of display areas further comprising:
a third display area displaying a recommended parameter indicator to selectively indicate one of the received parameter values as a recommended parameter value, the graphical object displayed in the third display area enabling a selection of a support line, a resistance line, a relative strength index (RSI), and a moving average convergence divergence (MACD),
a fourth display area displaying a trading signal indicator to indicate one of a buy or sell signal pertaining to the requested stock item, the graphical object displayed in the fourth display area including a notification based on the transmitted trading signal, the notification corresponding to the requested stock item and the recommended parameter value, and
a fifth display area displaying a histogram to indicate a number of different users relative to parameter values,
wherein the selection of the second display area determines the histogram displayed in the fifth display area, the displayed histogram representing a number of users compared to parameter values for users having a return rate of at least the minimum percentage.

18. The device claim 11, wherein the processor is further configured to generate a histogram comparing a number of different users to the received parameter values.

19. The device of claim 18, wherein the processor is further configured to determine the number of different users from an overall number of users based on a return rate.

20. The device of claim 19, wherein the histogram indicates the number of different users compared to parameter values received from a user device of each of the determined number of different users.

* * * * *